United States Patent [19]

Hartley

[11] 4,300,592
[45] Nov. 17, 1981

[54] PRESSURE REGULATOR

[76] Inventor: E. Dale Hartley, 1706 Decker Rd., Malibu, Calif. 90265

[21] Appl. No.: 726,526

[22] Filed: Sep. 27, 1976

[51] Int. Cl.³ .............................................. F16K 31/12
[52] U.S. Cl. ................................ 137/505.25; 137/533
[58] Field of Search .................................... 137/505.25

[56] References Cited

U.S. PATENT DOCUMENTS

| | | | |
|---|---|---|---|
| 3,372,707 | 3/1968 | Dunn | 137/505.25 |
| 3,454,041 | 7/1969 | Masson | 137/505.25 |
| 3,538,930 | 11/1970 | Kowalski | 137/505.25 X |
| 3,664,369 | 5/1972 | Johnson | 137/505.25 X |

FOREIGN PATENT DOCUMENTS 173298  2/1935  Switzerland .................... 137/505.25

*Primary Examiner*—Harold W. Weakley
*Attorney, Agent, or Firm*—Gordon L. Peterson

[57] ABSTRACT

A pressure regulator comprising a housing having an inlet connectable to a source of fluid at inlet pressure, an outlet, and a flow passage extending between the inlet and the outlet. A valve seat is mounted on the housing and in the flow passage. A valve element is mounted in the flow passage for movement between a closed position in which the valve element engages the valve seat to block flow through the flow passage and an open position in which the valve element does not block flow through the flow passage. Fluid downstream of the valve seat is at regulated pressure. The valve element is spring biased toward an open position. The valve element is pressure responsive and has a first pressure responsive area at least a portion of which is exposed to inlet pressure and a second pressure responsive area which is exposed to regulated pressure. The first area is smaller than the second area. With this arrangement, the fluid at inlet pressure and the spring urge the valve element toward the open position and the fluid at regulated pressure urges the valve element toward the closed position.

10 Claims, 4 Drawing Figures

PRESSURE REGULATOR

BACKGROUND OF THE INVENTION

A pressure regulator is used to reduce a relatively high inlet pressure to a lower regulated pressure. Although the inlet pressure may vary, the regulated pressure should not vary substantially.

One use of a pressure regulator is to provide regulated water pressure for use in the water system of a recreational vehicle. Specifically, a source of water under pressure, such as a municipal water supply, is connected to the water system of the recreational vehicle through a pressure regulator. The pressures which the recreational vehicle water system may encounter in being coupled to various different water sources may vary widely. A primary purpose of the pressure regulator is to limit the pressure of the water introduced to the vehicle water system to a level which will not break or damage the fittings and other components of the water system.

A typical prior art regulator includes a housing defining an inlet chamber, a regulated pressure chamber and a closed chamber arranged in axially aligned relationship. A valve seat is located at the juncture of the inlet chamber and the regulated pressure chamber. A valve element lies partially in the inlet chamber and extends rearwardly through the regulated pressure chamber. The valve element is mounted on a movable diaphragm which divides the closed chamber from the regulated pressure chamber. A spring in the closed chamber acts against the diaphragm and urges the valve element toward an open position. The inlet pressure in the inlet chamber acts on the valve element, and the regulated pressure in the regulated pressure chamber acts on the diaphragm to urge the valve element toward a closed position. Thus, with this prior art construction, both the inlet pressure and the regulated pressure tend to close the valve element and only the spring tends to open the valve element.

One problem with this prior art construction is that it is subject to lock up. Lock up is a condition in which the valve element is locked in the closed position and no flow can occur through the pressure regulator. Lock up can occur, for example, if the inlet pressure materially increases when the valve element is in the closed position. In this event, the force of the spring may be insufficient to move the valve element to the open position even if the regulated pressure drops.

Another problem with this prior art pressure regulator is that its operation tends to be unstable and it may cause water hammer. For example, when the valve element closes, flow through the regulator is terminated. In this event, the pressure at the inlet of the regulator increases slightly because, at no flow, there are no line losses. This means that the regulated pressure must drop a predetermined significant increment before the force of the spring is sufficient to open the valve element. Similarly, as the valve element is moved toward the closed position and the pressure at the inlet rises slightly due to a reduction in line losses, this increase in inlet pressure augments the closing force already existing on the valve element. As a result, the valve element tends to accelerate toward the closed position, and the consequent abrupt shut off may produce water hammer.

Finally, this prior art pressure regulator has an inlet opening axially, and the regulated pressure outlet opens radially. This 90-degree relationship between the inlet and the outlet tends to create plumbing problems with installation in walls of different thicknesses. To overcome this, the prior art pressure regulator is designed in different size units because a single standard size would not meet all of the installation requirements.

SUMMARY OF THE INVENTION

The present invention provides a pressure regulator in which lock up due to increased inlet pressure cannot occur. The valve element of the pressure regulator of this invention moves smoothly and evenly toward the closed position. The valve element will open in response to a much smaller regulated pressure drop than with the prior art construction described above with the result that the regulated pressure is maintained within smaller tolerances. The installation problem noted above is solved by arranging the inlet and outlet in axially aligned relationship. This is accomplished without unduly radially widening the regulator.

In the prior art construction described above, both the inlet pressure and the regulated pressure tend to close the valve element and only the force of the spring tends to open the valve element. By way of contrast, with the present invention, the regulated pressure provides the only force tending to close the valve element, and the inlet pressure and a spring combine to provide a force tending to open the valve element. With this arrangement, lock up due to increasing inlet pressure cannot occur because increasing inlet pressure tends to open the valve element. In addition, the increase in inlet pressure resulting from reduction in line losses as the valve element moves toward the closed position opposes the closure of the valve element. This causes the valve element to travel in a smooth, even manner to meter or throttle the liquid flow as the valve element moves toward the closed position. Accordingly, stability is maintained, and there is virtually no likelihood that closure of the valve element will produce water hammer. Finally, only a very slight drop in the regulated pressure enables the inlet pressure and the spring to open the valve element so that the regulated pressure is maintained within close tolerances.

To implement this concept, the pressure regulator may include a housing having an inlet connectable to a source of fluid at inlet pressure, an outlet, and a flow passage extending between the inlet and the outlet. A valve seat is mounted on the housing in the flow passage. The flow passage includes an inlet chamber between the valve seat and the inlet and a regulated pressure chamber between the valve seat and the outlet. A valve element is mounted in the flow passage for movement between a closed position and an open position with the pressure of the fluid downstream of the valve seat being the regulated pressure.

The valve element is pressure responsive and includes a first pressure responsive area at least a portion of which is exposed to inlet pressure. The force of the pressure acting on the first area urges the valve element toward the open position. In addition, a spring resiliently urges the valve element toward the open position.

The valve element also includes a second pressure responsive area which is exposed to regulated pressure. The force of the regulated pressure acting on the second area urges the valve toward the closed position. The first area is smaller than the second area so that the valve element has differential areas. This enables the regulated pressure to close the valve element against the opposing force provided by the inlet pressure and the spring.

The present invention also includes several structural features which contribute to the performance of the regulator. For example, the pressure regulator can advantageously include a flexible diaphragm which performs numerous functions. For example, the diaphragm can be used to close the upstream end of the regulated pressure chamber so that the only communication provided between the inlet chamber and the regulated pressure chamber is through an opening in the valve seat. The diaphragm can also carry the valve element and mount it for movement between the open and closed positions.

Although the valve element can be mounted on the diaphragm in various ways, the present invention provides for securely mounting the valve element on the diaphragm without puncturing the diaphragm and without the use of any adhesive. This can advantageously be accomplished by providing cooperating projections and recesses on the diaphragm and the valve element with the projections being snugly received in the recesses. This interlocking relationship tends to frictionally retain the valve element on the diaphragm. In addition, at least a region of the valve element and diaphragm is subjected to differential pressure which tends to maintain the interlocking engagement between the projections and recesses. This is accomplished, at least in part, by exposing one face of the valve element to the regulated pressure in the regulated pressure chamber and by subjecting at least a portion of the opposite face of the diaphragm to basically atmospheric pressure and spring pressure.

The diaphragm preferably has an opening therein to accommodate flow through the diaphragm. The outer periphery of the diaphragm can be mounted, for example, on the housing, and the inner periphery of the diaphragm can also be suitably mounted. In a preferred construction, a tubular wall is provided in the housing which defines a portion of the inlet chamber, and the diaphragm extends between the peripheral wall of the housing and the tubular wall.

The valve element is in the regulated pressure chamber, and this construction and arrangement of parts materially contributes to enabling fluid to flow generally axially through the regulator. Accordingly, the inlet, the inlet chamber, the regulated pressure chamber, and the outlet can all be coaxial to facilitate installation of the pressure regulator. In addition, the area of the valve element exposed to inlet pressure can be relatively small.

For many applications, the pressure regulator must prevent reverse flow of fluid from the outlet to the inlet. With the present invention, this function is performed by a check valve which is carried by the valve element. In a preferred construction, the valve element has an opening therein, and the check valve includes a resilient means carried by the valve element for covering the opening. Projection means are carried by the housing for preventing the resilient element from sealing against the housing when the regulated pressure urges it away from the opening.

The invention, together with further features and advantages thereof, may best be understood by reference to the following description taken in connection with the accompanying illustrative drawing.

DESCRIPTION OF THE PREFERRED EMBODIMENT

Figure 1:
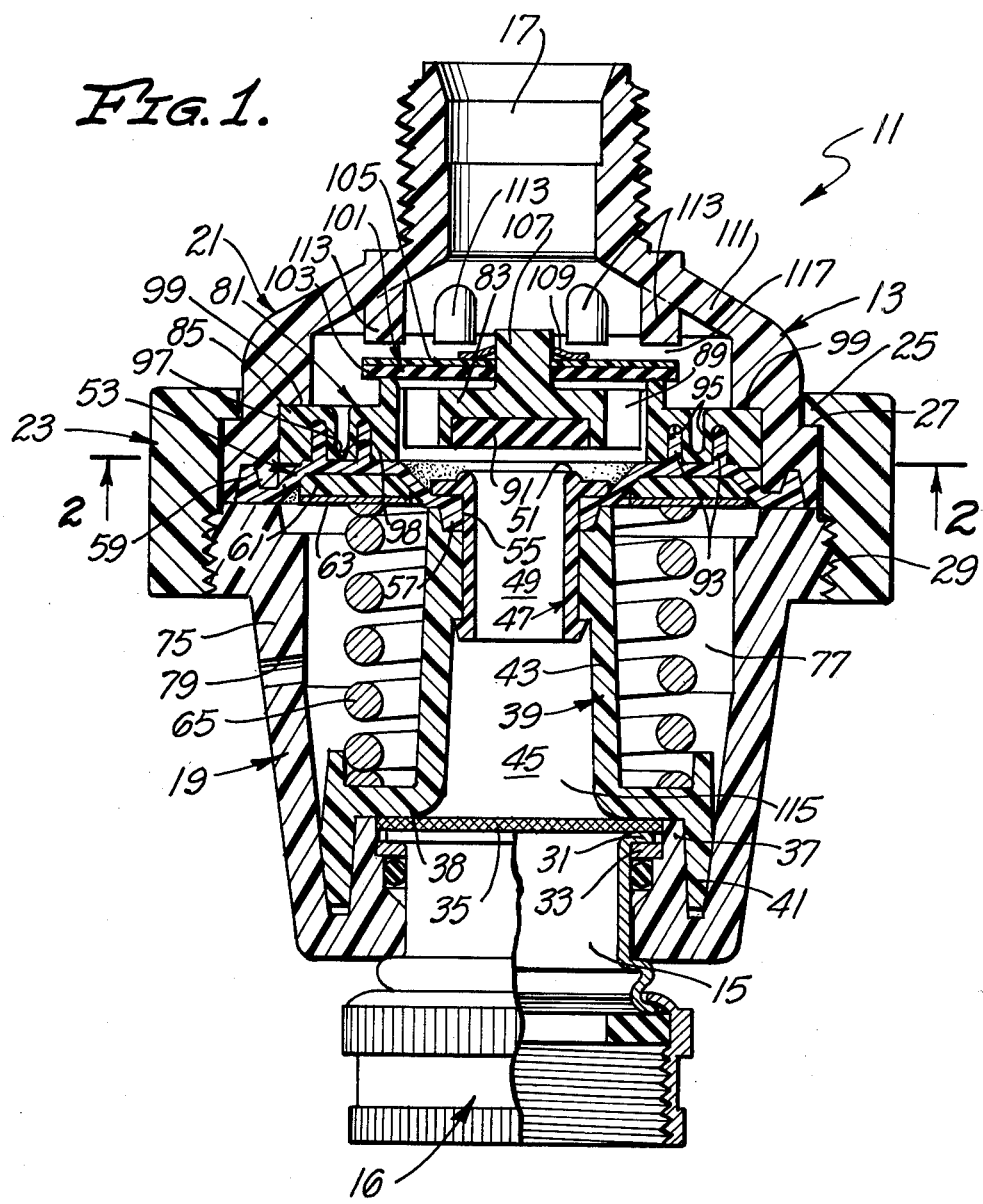
FIG. 1 is an axial sectional view through a regulator constructed in accordance with the teachings of this invention with a portion of the regulator adjacent the inlet being shown in elevation.

FIG. 1 shows a pressure regulator 11 which includes a housing 13. The housing 13 has an inlet 15 which, in the embodiment illustrated, is in the form of female hose coupling 16 and an outlet 17. Although the housing 13 may be of many different configurations and can be constructed of different materials, in the embodiment illustrated, it is constructed entirely of plastic and includes housing sections 19 and 21 and a coupling section 23 for joining the housing sections 19 and 21 together. The coupling section 23 has an annular flange 25 which engages an annular shoulder 27 on the housing section 21. The coupling section 23 is attached to the coupling section 19 by threads 29.

The hose coupling 16 projects through an opening in one end of the housing section 19 and has an annular flange 31 which is sandwiched between an annular retainer 33 and a porous inlet filter 35. The inlet filter 35 is confined circumferentially by an upstanding boss 37 molded integrally with one end of the housing section 19. The inlet filter 35 is held in position by a web portion 38 of an inner tubular member 39. The tubular member 39 has a skirt 41 which is attached, as by a solvent weld or ultrasonic weld, to the boss 37 and the peripheral wall of the housing section 19. The tubular member 39 has a tubular wall 43 and an axial passage 45 communicating with, and in axial alignment with, the inlet filter 35 and the inlet 15.

A tubular insert 47 of plastic or other suitable material is held by a snap fit within the axial passage 45. The tubular insert 47 has an axial opening or passage 49 extending axially therethrough, and the downstream end of the insert 47 defines an annular valve seat 51. The tubular member 39 and the insert 47 can be constructed, for example, of molded plastic material.

A flexible, resilient diaphragm 53 is mounted within the housing. The diaphragm 53 has a central opening 55, and the inner periphery of the diaphragm is in the form of an annular bead 57 which is clamped between the upper end of the tubular wall 43 and a flange integral with the insert 47. The outer periphery of the diaphragm 53 is in the form of an annular bead 59, and it is clampingly retained between the ends of the housing sections 19 and 21. The beads 57 and 59 also form seals between the tubular wall 43 and the insert 47 and between the housing sections 19 and 21, respectively. The diaphragm 53, which may be constructed of rubber or other suitable flexible, resilient material, contains sufficient slack so that the portions thereof between the inner and outer peripheries can be moved axially within the housing 13.

A rigid plastic back-up ring 61 and a metal stiffening ring 63 are postioned on the upstream side of the diaphragm 53, and they surround the tubular wall 43. A coil compression spring 65 acts between the web portion 38 of the tubular member 39 and the stiffening ring 63 to resiliently bias the diaphragm 53 upwardly, as viewed in FIG. 1, and to hold the back-up ring 61 tightly against the diaphragm and the stiffening ring tightly against the back-up ring. The spring 65 may have a linear spring rate.

The housing 9 has a peripheral wall 75 which surrounds, and which is spaced radially outwardly from, the tubular wall 43 to define therewith a vented chamber 77. This chamber 77 is maintained at ambient pressure by a vent opening 79 in the peripheral wall 75. The back-up ring 61, the stiffening ring 63, and the spring 65 are located in the vented chamber 77.

Figure 2:
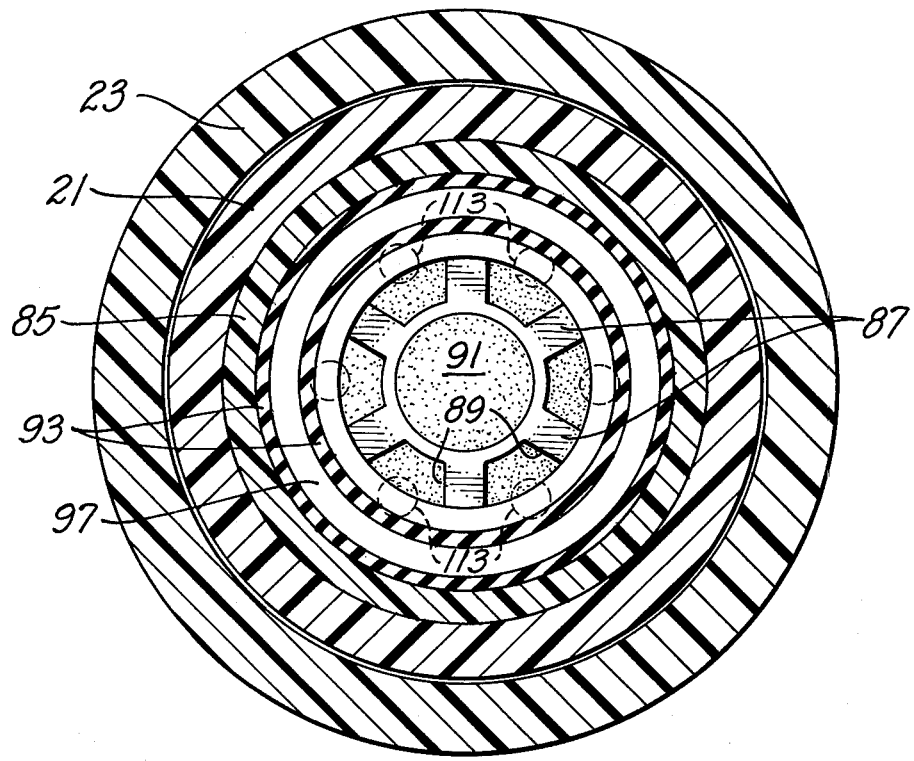
FIG. 2 is a sectional view taken generally along line 2—2 of FIG. 1.
Figure 3:
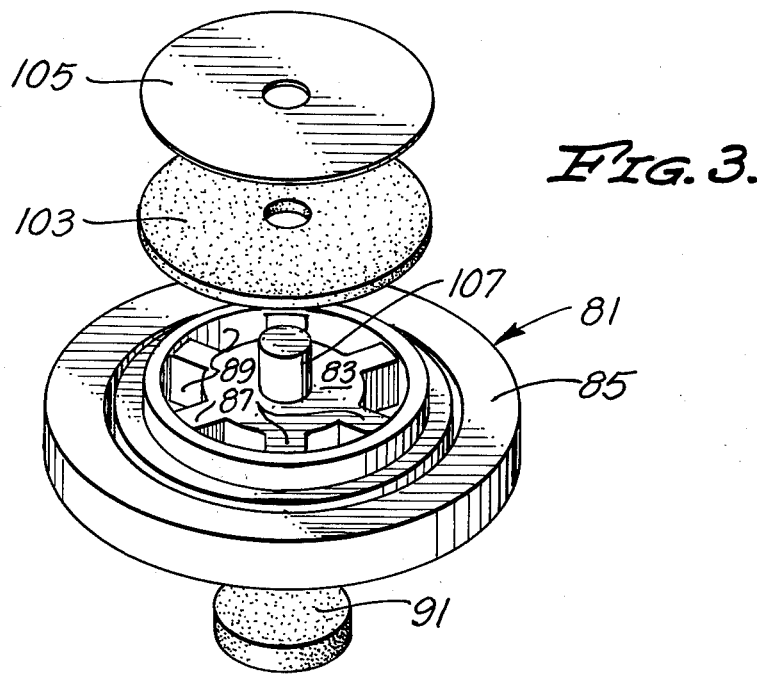
FIG. 3 is an exploded perspective view of the valve element and portions of the check valve.

A valve element 81 is mounted on, and carried by, the diaphragm 53. As shown in FIGS. 1-3, the valve element 81 includes a central portion or disc 83 integrally joined to an outer portion or ring 85 by a plurality of circumferentially spaced webs 87 with the spaces between adjacent webs defining openings 89. The valve element 81 also includes a resilient pad 91 suitably retained within a recess in the central disc 82. The pad 91 has a surface 92 which is engageable with the valve seat 51 and which is spaced from the openings 89. Although the valve element 81 may be of various different configurations, in the embodiment illustrated, it is relatively intricately shaped, and for this reason, it can, except for the pad 91, advantageously be constructed of rigid, molded plastic material.

To mount the valve element 81 on the diaphragm 53, the diaphragm includes two concentric, radially spaced, annular projections or ribs 93 integrally formed with the remainder of the diaphragm. The valve element 81 has a pair of annular recesses 95 for receiving the ribs 93, respectively, and an annular double-walled projection or rib 97 sized to be snugly received in an annular recess or space 98 between the two ribs 93. This frictionally attaches the valve element 81 to the diaphragm 53, and as explained below, during use of the pressure regulator 11, a pressure differential exists across the valve element and the diaphragm which tends to maintain this frictional fit.

In the position shown in FIG. 1, the valve element is in an open position in that the valve element is spaced axially from the valve seat 51. Travel of the valve element 81 further away from the valve seat 51 under the biasing action of the spring 65 is prevented by a plurality of stops 99 (only two being shown in FIG. 1) formed integrally with the housing section 21 and engaging the outer ring 85 of the valve element 81.

A check valve 101 is carried by the valve element 81 to prevent flow of fluid in a direction from the outlet 17 back toward the inlet 15. In the embodiment illustrated, the check valve 101 includes flexible means comprised of a flexible, resilient element 103 constructed of rubber or other similar material and a spring disc 105 constructed of a suitable resilient plastic, such as Mylar. The check valve also includes a post 107 integral with the valve element 81 on which the flexible element 103 and the disc 105 are mounted and a metal retainer 109 for holding the flexible element and the disc on the post. In the position shown in FIG. 1, the inherent resilience of the flexible element 103 and the disc 105 hold the flexible element 103 over all of the openings 89 in the valve element 81.

The flexible element 103 and the disc 105 lie adjacent an end wall 111 of the housing 13. To prevent the disc 105 from sealing against the end wall 111 when it is forced upwardly, as viewed in FIG. 1 by fluid under pressure, the housing 13 has a plurality of circumferentially spaced integral projections 113 projecting downwardly toward the periphery of the flexible element 103.

As shown in FIG. 1, the pressure regulator 11 has an inlet chamber 115 which extends essentially from the valve seat 51 downwardly (as viewed in FIG. 1) through the inlet 15. A regulated pressure chamber 117 extends essentially from the valve seat 51 to the outlet 17. The inlet 15, inlet chamber 115, regulated pressure chamber 117, and the outlet 17 are coaxial and they define an essentially axial flow passage through the regulator 11. The valve seat 51 is located essentially at the junction between the chambers 115 and 117. The diaphragm 53 sealingly closes the upstream end of the regulated pressure chamber 117, except for the opening 49 provided through the valve seat 51. The diaphragm 53 also sealingly separates the regulated pressure chamber 117 from the chamber 77 which surrounds a substantial length of the inlet chamber 115.

The spring 65 normally holds the valve element 81 in the open position shown in FIG. 1. In operation, the inlet 15 is coupled to a source of fluid under pressure, such as water, and the outlet 17 is coupled to a system, such as the water system of a recreational vehicle.

Water from the inlet 15 flows into the inlet chamber 115 past the valve seat 51 and forces the flexible element 103 upwardly to open the openings 89. Water can then flow through the openings 89 to the outlet 17. As the water continues to flow, pressure in the regulated pressure chamber 117 increases.

The valve element is pressure responsive and has pressure responsive, differential areas. The pressure in the regulated pressure chamber acts essentially over the entire downstream-facing surface of the valve element 81, and the resultant force tends to urge the valve element 81 toward a closed position. Opposing the closing force is an opening force. The opening force is comprised by the force exerted by the spring 65 and the pressure of the water at inlet pressure acting over an upstream-facing area of the valve element 81 which includes the area of the resilient pad 91 which is circumscribed by the valve seat. In addition, regulated pressure acts on the remaining upstream face of the valve element, except for the annular area between the ribs 93. The total pressure responsive upstream-facing area is less than the above-mentioned downstream-facing area so that the net force on the valve element due to fluid pressure always tends to move the valve element upstream.

As the regulated pressure in the regulated pressure chamber 117 increases, the closing force progressively increases with the result that the valve element 81 is moved toward a closed position. However, as the valve element moves toward the closed position, the opening force also increases to prevent abrupt shut-off of the water. The opening force increases because the spring force increases linearly as the spring 65 is further compressed. In addition, the force resulting from the inlet pressure acting against the resilient pad 91 increases because the line losses reduce as flow rate reduces, and hence inlet pressure increases as flow through the regulator 11 reduces. Thus, both components of the opening force increase as the valve element 81 is moved toward the closed position.

Figure 4:
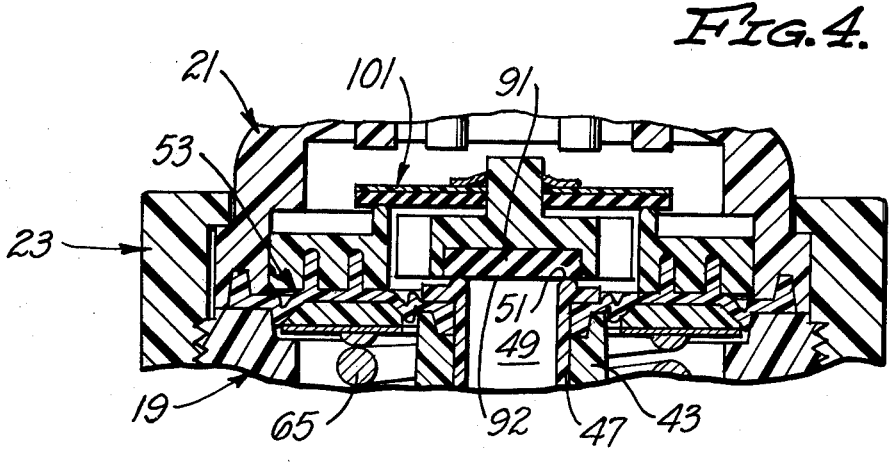
FIG. 4 is a fragmentary sectional view showing the valve element in the closed position.

Assuming that the regulated pressure increases sufficiently, the valve element 81 ultimately reaches the closed position shown in FIG. 4. In the closed position, the surface 92 of the resilient pad 91 of the valve element 81 sealingly engages the valve seat 51 to block flow through the opening 49. If the regulated pressure should drop very slightly due, for example, to use of the regulated pressure water supply, the valve element is opened a corresponding slight amount by the above-described opening force. The regulated pressure is less than the inlet pressure due to the pressure drop across the orifice defined between the valve element 81 and the valve seat 51.

It should be noted that the valve element 81 is attached to the diaphragm 53 without using an adhesive and without forming an opening in the diaphragm. A pressure differential exist across the valve element 81 and the diaphragm 53 when the regulator 11 is in use, tending to hold the ribs 93 in the recesses 95 and tending to hold the rib 97 in the recess 98. Specifically, the net fluid force on the valve element 18 tends to move the valve element 81 upstream (down as viewed in FIG. 1) and the spring 65 urges the diaphragm up, as viewed in FIG. 1.

Although an exemplary embodiment of the invention has been shown and described, many changes, modifications and substitutions may be made by one having ordinary skill in the art without necessarily departing from the spirit and scope of this invention.

I claim:

1. A pressure regulator comprising:
    a housing having an inlet connectible to a source of fluid at inlet pressure, an outlet and a flow passage extending between the inlet and the outlet;
    a tubular wall in said housing defining a portion of said flow passage;
    a valve seat mounted on said housing in said flow passage, a region of said flow passage downstream of said valve seat being a regulated pressure chamber;
    a valve element;
    a flexible diaphragm extending between said tubular wall and said housing and being movable generally axially of said housing;
    means for mounting said valve element in the regulated pressure chamber and on said flexible diaphragm for movement of the valve element between a closed position in which the valve element engages the valve seat to block flow through the flow passage and an open position in which the valve element does not block flow through the flow passage, the pressure of the fluid in the regulated pressure chamber being regulated pressure and said regulated pressure urging the valve element toward the closed position;
    spring means for resiliently urging the diaphragm toward the regulated pressure chamber and the valve element toward the open position; and
    said valve element mounting means including at least one generally axially extending projection and at least one generally axially extending recess on said diaphragm and said valve element, said projection being received in said recess whereby the regulated pressure and the spring means cooperate to tend to hold the projection in the recess.

2. A pressure regulator as defined in claim 1 including a tubular insert inserted in said tubular wall, said flexible diaphragm being generally annular and having an inner periphery, said inner periphery being clamped between the tubular insert and the tubular wall, and said valve seat being on said tubular insert.

3. A pressure regulator as defined in claim 1 wherein said valve element has a surface engageable with the valve seat and an opening spaced from said surface for the passage of fluid under regulated pressure therethrough, and said pressure regulator includes check valve means carried by the valve element for substantially blocking flow through the opening in a direction from the outlet toward the inlet.

4. A pressure regulator as defined in claim 3 wherein said check valve means includes resilient means carried by said valve element and covering said opening, said pressure regulator includes projection means carried by said housing for preventing the resilient means from sealing against the housing when the regulated pressure urges it away from the opening.

5. A pressure regulator as defined in claim 4 including a tubular insert inserted in said tubular wall, said flexible diaphragm being generally annular and having an inner periphery, said inner periphery being clamped between the tubular insert and the tubular wall, and said valve seat being on said tubular insert.

6. A pressure regulator as defined in claim 1 wherein said housing has a peripheral wall circumscribing the tubular wall and said peripheral wall has a vent opening therein to provide atmospheric pressure between the peripheral wall and said tubular wall to act on one face of the diaphragm.

7. A pressure regulator comprising:
    a housing having an inlet connectible to a source of fluid at inlet pressure, an outlet and a flow passage extending between the inlet and the outlet;
    a tubular wall in said housing defining a portion of said flow passage;
    a flexible diaphragm having an opening therein and inner and outer peripheries;
    first means for mounting the diaphragm on said housing along the outer periphery of the diaphragm;
    a tubular insert inserted into said tubular wall, said inner periphery being clamped between the tubular insert and the tubular wall, said diaphragm being movable at least between said peripheries thereof;
    said tubular insert having a valve seat thereon, said valve seat having an opening therein;
    said valve seat being adjacent the opening in the diaphragm so that fluid can flow through both of said openings, said diaphragm being subjected to the pressure of the fluid downstream of the valve seat;
    a pressure responsive valve element carried by the diaphragm and movable between a closed position in which the valve element engages the valve seat to block flow through the opening of the valve seat and an open position in which fluid can flow through the opening in the valve seat; and
    spring means for urging said valve element toward said open position.

8. A pressure regulator as defined in claim 7 wherein said valve element has a surface engageable with the valve seat and an opening spaced from said surface for the passage of fluid under regulated pressure therethrough, and said pressure regulator includes check valve means carried by the valve element for substantially blocking flow through the opening in a direction from the outlet toward the inlet.

9. A pressure regulator as defined in claim 8 wherein said check valve means includes resilient means carried by said valve element and covering said opening, said pressure regulator includes projection means carried by said housing for preventing the resilient means from sealing against the housing when the regulated pressure urges it away from the opening.

10. A pressure regulator comprising:
- a housing having an inlet connectible to a source of fluid at inlet pressure, an outlet, and a flow passage extending between the inlet and the outlet;
- a valve seat mounted on said housing in said flow passage;
- a valve element;
- means for mounting said valve element on said housing in said flow passage for movement between a closed position in which the valve element engages the valve seat to block flow through the flow passage and an open position in which the valve element does not block flow through the flow passage, the pressure of the fluid downstream of the valve seat being regulated pressure;
- spring biasing means for resiliently urging the valve element toward the open position;
- said valve element being pressure responsive and including a first pressure responsive area at least a portion of which is exposed to inlet pressure with the force of the pressure acting of the first area urging the valve element toward said open position and a second pressure responsive area which is exposed to regulated pressure with the force of the pressure acting on the second area urging the valve element toward said closed position;
- said first area being smaller than said second area whereby the valve element has differential areas;
- said valve element having a surface engageable with the valve seat and an opening spaced from said surface for the passage of fluid under regulated pressure therethrough;
- check valve means carried by the valve element for substantially blocking flow through the opening in a direction from the outlet toward the inlet;
- said check valve means including resilient means carried by said valve element and covering said opening; and
- projection means carried by said housing for preventing the resilient means from sealing against the housing when the regulated pressure urges it away from the opening.

* * * * *